United States Patent
Campbell

[11] Patent Number: 5,824,974
[45] Date of Patent: Oct. 20, 1998

[54] INSULATING LAYER WITH INTEGRAL GROMMETS

[75] Inventor: Michael T. Campbell, Grand Rapids, Mich.

[73] Assignee: Cascade Engineering, Inc., Grand Rapids, Mich.

[21] Appl. No.: 899,983

[22] Filed: Jul. 24, 1997

Related U.S. Application Data

[60] Provisional application No. 60/022,668 Jul. 26, 1996.

[51] Int. Cl.[6] .............................. E04B 1/82; B62D 33/00; A44B 17/00
[52] U.S. Cl. ............................ 181/290; 296/39.3; 24/297
[58] Field of Search ..................................... 181/290, 293, 181/295; 296/39.3; 24/297, 289; 411/913

[56] References Cited

U.S. PATENT DOCUMENTS

| | | |
|---|---|---|
| Re. 19,840 | 1/1936 | Woodall . |
| 1,945,717 | 2/1934 | Woodall . |
| 2,223,395 | 12/1940 | Van Buren . |
| 3,942,239 | 3/1976 | Johansson . |
| 4,083,595 | 4/1978 | Maier . |
| 4,244,438 | 1/1981 | Willmann . |
| 4,529,244 | 7/1985 | Zaydel . |
| 4,800,984 | 1/1989 | Kerman . |
| 4,923,542 | 5/1990 | Janicki et al. . |
| 5,005,898 | 4/1991 | Benedetto et al. . |
| 5,189,779 | 3/1993 | Fishel et al. . |
| 5,243,153 | 9/1993 | Holwerda . |
| 5,295,652 | 3/1994 | Byrne . |
| 5,387,065 | 2/1995 | Sullivan . |
| 5,483,028 | 1/1996 | Holwerda . |
| 5,489,177 | 2/1996 | Schmidt, Jr. . |
| 5,507,610 | 4/1996 | Benedetti et al. . |
| 5,542,158 | 8/1996 | Gronau et al. ............................. 24/297 |
| 5,557,078 | 9/1996 | Holwerda . |

FOREIGN PATENT DOCUMENTS

| | | |
|---|---|---|
| 2 637 863 | 4/1990 | France . |
| 2 010 630 | 11/1972 | Germany . |
| 88 03 882.3 | 7/1989 | Germany . |
| 39 08 106 A1 | 8/1990 | Germany . |
| 59-120545 | 7/1984 | Japan . |
| 61-249878 | 11/1986 | Japan . |

*Primary Examiner*—Khanh Dang
*Attorney, Agent, or Firm*—Rader, Fishman, Grauer & Mc Garry

[57] ABSTRACT

An acoustical barrier (10) is mounted to the barrier wall (20) of a motor vehicle. The acoustical barrier (10) includes a mass layer (12) of molded construction and sound dampening characteristics. The mass layer (12) includes a plurality of grommets (14, 14', 14", 54) integrally molded as a single piece with a lower surface of the mass layer. Each grommet (14, 14', 14", 54) has a continuous wall with an inner peripheral surface (27, 27', 27") with an upper portion of the wall integrally formed with the inner surface (18) of the mass layer and a lower portion of the wall having a lower edge (22, 22', 22") abutting the barrier wall (20). The inner surface (27, 27', 27") of the continuous wall defines an opening in each grommet (14, 14', 14", 54). A plurality of openings (25, 25', 25") in the mass layer are in communication with at least some of the grommet openings. Various fasteners (26, 70), shafts or sleeves (62), cables (64), wires, and other vehicle accessories can extend through one or more of the grommets and through corresponding openings (29) in the vehicle barrier wall (20)

23 Claims, 2 Drawing Sheets

INSULATING LAYER WITH INTEGRAL GROMMETS

CROSS REFERENCE TO RELATED APPLICATIONS

This application claims the benefit of U.S. Provisional Application No. 60/022,668 filed on Jul. 26, 1996.

BACKGROUND OF THE INVENTION

1. Field of the Invention

This invention relates to sound insulating layers for structural supports, and more particularly to a vehicle sound insulating layer having integrally molded grommets for fastening accessories to the insulating layer and for sealing the passenger compartment from the outside environment.

2. Description of the Related Art

In most contemporary automobiles, a steel fire wall separates the engine compartment from the passenger compartment. To reduce the transmission of sound from the engine compartment through the fire wall and into the passenger compartment, a sound barrier mat (otherwise known as a dash mat) is typically molded of an elastomeric material. The dash mat is mounted to and substantially overlies the fire wall such that an outer surface of the mat is in contact with a bottom surface of the vehicle carpet and extends beyond the carpet to an upper portion of the fire wall behind the instrument panel. Multiple apertures are formed in the dash mat for receiving a corresponding number of mounting studs that project from the fire wall for securing the dash mat thereto. Other apertures in the dash mat are aligned with openings in the fire wall for the passage of cable guides, electrical wires, brake booster shafts, accessory mounts, and so on. The dash mat is typically spaced from the fire wall by an absorber layer that is usually constructed of an open cell foam or fiberglass material.

To install the sound insulating layer in a vehicle, each aperture is aligned with its corresponding stud and pushed thereover until the insulating layer (or absorber layer if so equipped) contacts the fire wall. Subsequently, an end connector is positioned on the stud to prevent separation of the layers from the fire wall. The inner peripheral edges of the apertures are subject to damage from the stud when the dash mat is in the installed position. Eventually, the aperture may deform and the dash mat may separate from the stud and fire wall. Consequently, any seal that may have existed between the engine and passenger compartments may be broken. Thus, noise, air, water, etc. may undesirably transfer from the engine compartment to the passenger compartment through the broken seal.

SUMMARY OF THE INVENTION

According to the invention, an acoustical barrier adapted to be mounted to a barrier wall of a vehicle or other structure includes a mass layer of a molded construction and sound dampening characteristics. The mass layer has an inner surface that is adapted to face the barrier wall and an outer surface that is adapted to face away from the barrier wall. A grommet is integrally molded as a single piece with the mass layer. The grommet includes a continuous wall with an upper portion of the wall integrally formed with the inner surface of the mass layer and a lower portion of the wall having a lower edge adapted to contact the barrier wall. An inner surface of the continuous wall defines an opening in the grommet. An opening extends through the mass layer between the inner and outer surfaces thereof with the opening in the grommet being in communication with the opening in the mass layer.

The invention further comprises one or more fasteners with an elongate stud and a head formed at one end of the stud. The stud preferably extends at least through one of the grommet and mass layer openings.

In one embodiment, the fastener head is located within the opening in the grommet; and the area between the cross dimensions of the head and the grommet opening is less than the area between the cross dimensions of the stud and the mass layer opening such that wear between the stud and mass layer opening is prevented. The sleeve can be a threaded sleeve when the stud is threaded, or alternatively a locking slide that frictionally grips the outer surface of the stud.

In a further embodiment, the fastener head is located within the grommet opening and abuts the inner surface of the mass layer. A locking sleeve is positioned over a free end of the stud opposite the fastener head for securing the fastener to the mass layer. A vehicle accessory having a wall can be mounted directly to the mass layer in the vicinity of the grommet by sandwiching the accessory wall between the mass layer outer surface and the sleeve. If the vehicle accessory is electrically powered, wires extending therefrom can be received in a bore extending through the fastener. In this manner, the wires can be directed through the barrier wall from the vehicle accessory without being exposed in the passenger compartment of the vehicle. According to an even further embodiment, a central axis of the grommet opening is coextensive with a central axis of the mass layer opening and the central axes extend at an acute angle to the plane of the outer surface of the mass layer in the area of the grommet.

Further according to the invention, a barrier wall of a motor vehicle has an acoustical barrier mounted thereto. The acoustical barrier includes a mass layer of a molded construction and sound dampening characteristics with an inner surface that faces the barrier wall and an outer surface that faces away from the barrier wall. A grommet is integrally molded as a single piece with the mass layer. Preferably, the grommet has a continuous wall with an upper portion of the wall integrally formed with the inner surface of the mass layer and a lower portion of the wall having a lower edge abutting the barrier wall. An inner surface of the continuous wall defines an opening in the grommet. An opening also extends through the mass layer between the inner and outer surfaces thereof with the opening in the grommet being in communication with the opening in the mass layer.

According to one embodiment, a fastener having an elongate stud and a head formed at one end thereof extends through the mass layer opening, the grommet opening and barrier wall opening with the fastener head abutting one of the barrier wall and the mass layer. A locking sleeve is positioned over a free end of the stud and abuts the other of the barrier wall and mass layer for securing the mass layer to the barrier wall.

According to a further embodiment, the opening in the mass layer is laterally and outwardly spaced from the opening in the barrier wall. A central axis of the opening in the grommet is coextensive with a central axis of the opening in the mass layer with the axes extending at an acute angle to the plane of the outer surface of the mass layer in the area of the grommet and intersecting the opening in the barrier wall. With this arrangement, the inner surface of the grommet wall serves as a guide for installing accessories through the offset openings in the barrier wall and mass layer.

Further according to the invention, an acoustical barrier is mounted to the barrier wall of a motor vehicle. The acoustical barrier includes a mass layer of molded construction and sound dampening characteristics. The mass layer includes a plurality of grommets integrally molded as a single piece with a lower surface of the mass layer. Each grommet has a continuous wall with an inner peripheral surface with an upper portion of the wall integrally formed with the inner surface of the mass layer and a lower portion of the wall having a lower edge abutting the barrier wall. The inner surface of the continuous wall defines an opening in each grommet. A plurality of openings in the mass layer are in communication with at least some of the grommet openings. Various fasteners, shafts or sleeves, cables, wires, and other vehicle accessories can extend through one or more of the grommets and through corresponding openings in the vehicle barrier wall.

BRIEF DESCRIPTION OF THE DRAWINGS

The invention will now be described with reference to the drawings in which.

DETAILED DESCRIPTION OF THE PREFERRED EMBODIMENTS

Figure 1:
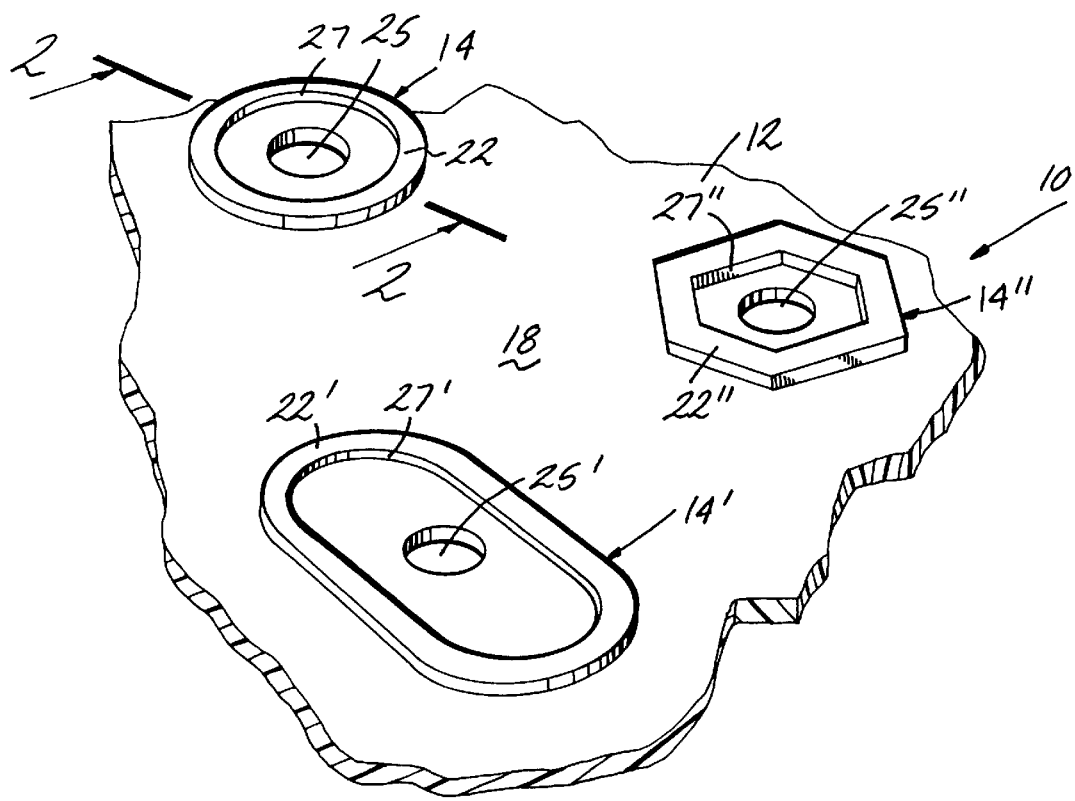
FIG. 1 is a perspective view of a dash mat assembly having several integrally formed grommets according to the invention.
Figure 2:
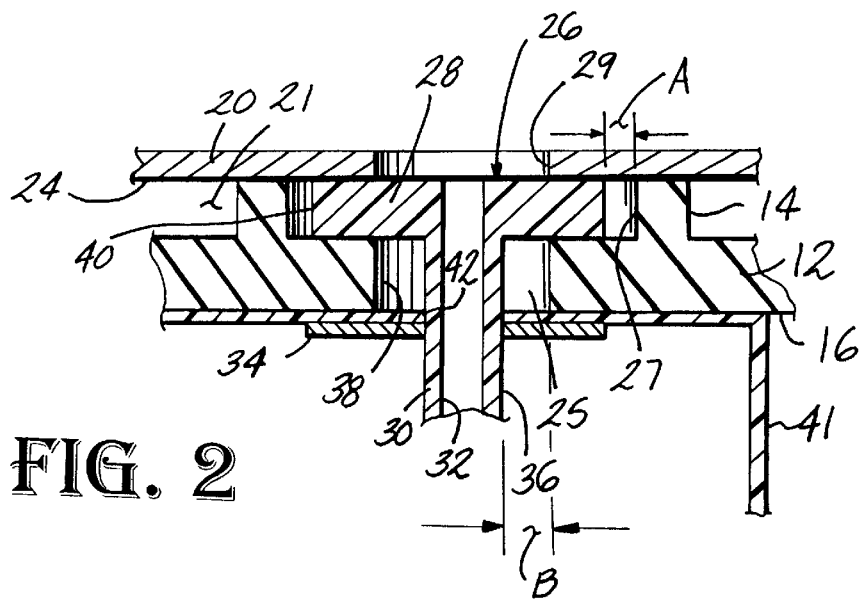
FIG. 2 is a cross-sectional view of the dash mat assembly taken along line 2—2 of FIG. 1 and illustrating a fastener assembly attached thereto.

Referring now to FIGS. 1 and 2, a dash mat assembly 10 includes a sound barrier mat or dash mat in the form of a mass layer 12 and an integrally molded grommet 14 that are preferably formed of a filled elastomeric moldable polymer, e.g., elastomeric polypropylene. The dash mat assembly 10 is attached to the fire wall of a vehicle from the passenger compartment side. The dash mat assembly 10 serves as a sound barrier layer to reduce the transmission of sound from the engine compartment through the fire wall and into the passenger compartment of a vehicle. An outer surface 16 of the sound barrier mat 12 typically faces the underside of a vehicle carpet (not shown) and extends past the carpet behind the instrument panel. An inner surface 18 of the mat 12 typically faces a fire wall 20.

The grommet 14 is integrally formed with the dash mat 12 during the molding process, and extends perpendicularly from the inner surface 18. An outer edge 22 of the grommet 14 is adapted to contact an outer surface 24 of the fire wall 20 when installed thereagainst to form a seal between the engine and passenger compartments of the vehicle. The grommet 14 additionally serves to space the dash mat 12 from the fire wall 20 to form a dead air space 21 therebetween. The dead air space 21 acts as an additional insulating layer against noise, vibration, etc., that may be present in the engine compartment. The height of grommet 14 can vary depending on the total volume of dead air space desired. The grommet 14 can thus replace the absorber layer that typically interfaces between the dash mat 12 and the fire wall 20, at least in some locations.

An opening 25 extends through the thickness of the dash mat 12 and is centrally located with respect to the inner peripheral surface 27 of the grommet. The opening 25 can be aligned with an opening 29 in the fire wall 20 when the dash mat assembly 10 is installed thereon.

A stud 30 of a fastener 26 is inserted through the opening 25 in the dash mat, while a head 28 of the fastener 26 abuts the inner surface 18 of the dash mat. A bore 32 extends through an axial center of the fastener 26 and is adapted to receive electrical wires, cables, etc., that may extend between the engine and passenger compartments through the openings 25, 29. Alternatively, the bore 32 can receive in locking engagement a stud (not shown) that extends from the fire wall and into the passenger compartment for securing the dash mat to the fire wall. A locking slide ring or sleeve 34 frictionally engages an outer surface 36 of the stud 30 to affix the fastener 26 to the dash mat 12.

In the past, an inner peripheral surface 38 of the opening 25 has been subject to friction and deformation from the stud 30. To eliminate this problem, and in accordance with the invention, the dimension "A" between the inner peripheral surface 27 of the grommet and an outer peripheral surface 40 of the fastener head 28 is smaller than the dimension "B" between the outer surface 36 of the stud 39 and the inner surface 38 of the opening 35. Thus, the fastener head 28 will contact the grommet 14 and prevent contact between the stud 30 and the inner surface 38. Any slippage between the fastener and the dash mat is arrested by the grommet, thereby eliminating wear and deformation of the opening 25 that would otherwise occur.

A variety of grommets can be integrally formed in the dash mat 12, and can be formed into various shapes, as illustrated in FIG. 1. Grommet 14', for example, is oblong, while grommet 14" is hexagonal. It is to be understood, however, that other shapes can be formed. It is only necessary that the inner peripheral surface (27, 27', 27") and contact surface (22, 22', 22") of the grommets (14, 14', 14"), respectively, are continuous, so as to seal the opening (25, 25', 25") from the insulating space 21 when installed against the fire wall 20.

With the present arrangement, a housing 41 can be attached directly to the dash mat 12 by inserting the stud 30 into an opening 42 of the housing and then installing the locking slide ring 34 thereover, as illustrated in FIG. 2. The housing 41 can form part of an electrical junction block, an accessory mount, or other similar device. The thickness of the dash mat 12 in the vicinity of the grommet 14, as well as the grommet itself, can be varied to directly support the weight of various accessories. The bore 32 of the fastener 26 can be in direct communication with the housing 41, as illustrated in FIG. 2, such that wires, cables, tubes, etc., leading from the engine compartment can be directly attached to the vehicle accessory associated with the housing 41.

Figure 3:
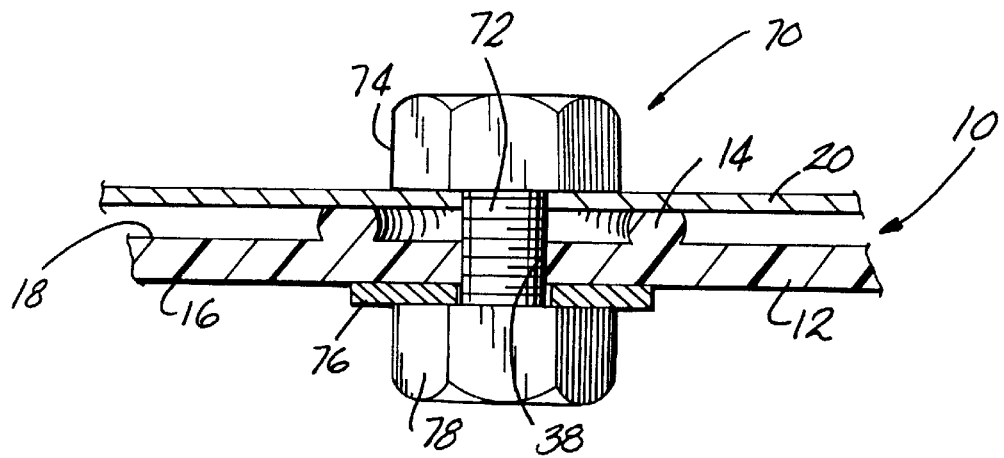
FIG. 3 is a cross-sectional view of the dash mat assembly similar to FIG. 2 and illustrating a different fastener assembly according to a second embodiment of the invention.

Turning now to FIG. 3, a different fastening arrangement is illustrated for the dash mat assembly 10, wherein like parts in the previous embodiment are represented by like numerals. A fastener 70 having a threaded stud 72 extends into the passenger compartment and is either welded to the inside surface of the fire wall 20 (not shown), or as shown, includes a head 74. The opening 38 in the dash mat 12 is aligned with the stud and the dash mat is pressed toward the fire wall 20. The opening 38 is preferably sized to frictionally receive and seal around the stud 72. A washer 76 is inserted on the stud until it contacts the outer surface 16 of the dash mat. A threaded nut or sleeve 78 is then installed over the shaft and torqued until the nut is snug. As in the FIG. 2 arrangement, an accessory or accessory housing (not shown) may also be mounted to the stud and secured directly to the dash mat by the nut and washer. Depending on the size and thickness of the grommet 14, the continuous wall thereof will tend to slightly bulge under the pressure exerted by the fastener. The thickness of the grommet wall can be increased or decreased depending on how much force is to be supported by the grommet.

In the above-described arrangement, the grommet functions as a compression limiter when attaching the dash mat to the fire wall or when attaching accessories to the dash mat. This function protects the dash mat from being damaged if the fastener is over-tightened. In addition, any accessories attached in the above-described manner to the dash mat are isolated from vehicle vibrations. This vibration isolation is especially important for electrical equipment or other vibration sensitive devices.

Figure 4:
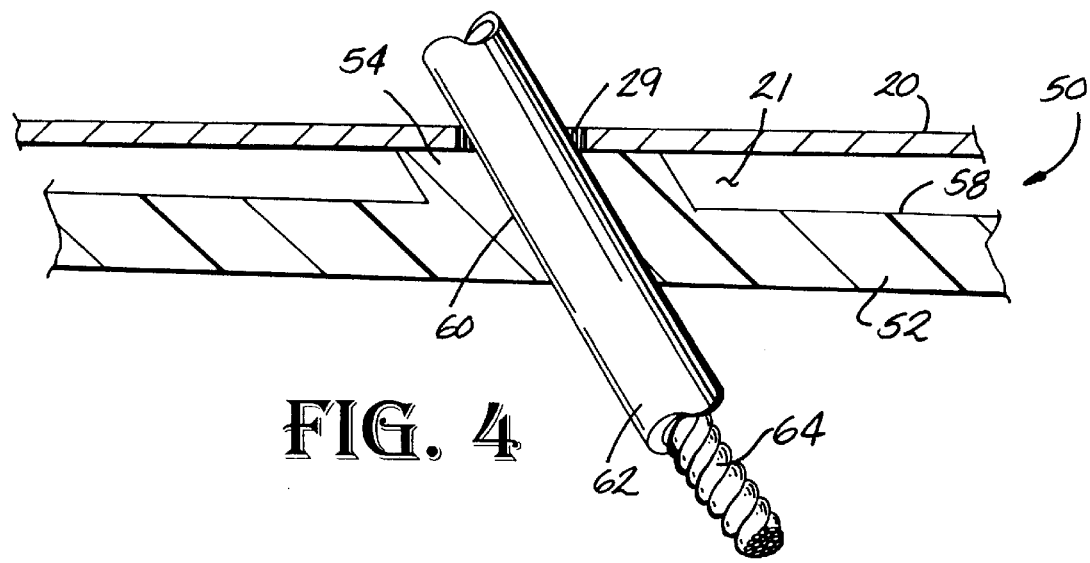
FIG. 4 is a cross-sectional view of a dash mat assembly having an integrally formed grommet according to a third embodiment of the invention.

With reference now to FIG. 4, a dash mat assembly 50 according to a second embodiment of the invention is shown, wherein like parts in the previous embodiment are represented by like numerals. The dash mat assembly 50 includes a sound barrier mat or dash mat 52 and an integrally molded grommet 54. The grommet 54 has a central axis which extends at an acute angle with respect to an inner surface 58 of the dash mat 52. An axial opening 60 in the grommet 54 is sized to receive the shaft 62 of a vehicle accessory. As illustrated, the shaft 62 is in the form of a cable sleeve and extends at an acute angle to the fire wall 20 when installed. A cable 64 associated with a shifting lever, clutch pedal, control valve, etc., is received within the sleeve and slidable with respect thereto. The angle of the grommet 54 can be varied to accommodate the angle of the sleeve or shaft to be installed.

The dash mat assembly 50 is installed on the fire wall 20 by first aligning the opening 60 in the grommet 54 with the opening 29 in the fire wall. The opening 29 typically extends transverse to the fire wall 20. The sleeve 62 is then inserted into the opening 60 and slid until a portion of the sleeve extends into the engine compartment. The grommet opening 60 is sized to frictionally hold the sleeve while providing a seal therearound. Thus, the grommet 54 serves as a spacer to create an insulating space 21 and to seal the space 21 from the engine compartment. In addition, the grommet 54 serves as a guide when installing the sleeve 62, to insure that the sleeve is easily inserted through the opening 29 in the fire wall. This unique feature is an improvement over the prior art systems, where a sleeve or shaft must be inserted at an acute angle through both a dash mat and a fire wall spaced therefrom. In the past, the spaced dash mat has made it difficult to locate the hole in the fire wall, especially when the sleeve or shaft must be inserted at an acute angle with respect thereto.

Although the invention has been described with particular reference to automobile dash mats, the invention also finds use in other automotive or non-automotive applications wherein decorative panels, covers, accessories, etc., can be attached temporarily or permanently to a support surface.

Reasonable variation and modification are possible within the spirit of the foregoing specification and drawings without departing from the scope of the invention.

The embodiments for which an exclusive property or privilege is claimed are defined as follows:

1. An acoustical barrier adapted to be mounted to a barrier wall, the acoustical barrier comprising:
   a mass layer of a molded construction and sound dampening characteristics, the mass layer having an inner surface that is adapted to face the barrier wall and an outer surface adapted to face away from the barrier wall;
   a grommet integrally molded as a single piece with the mass layer, the grommet having a continuous wall with an upper portion of the wall integrally formed with the inner surface of the mass layer and a lower portion of the wall having a lower edge adapted to contact the barrier wall, an inner surface of the continuous wall defining an opening in the grommet; and
   an opening extending through the mass layer between the inner and outer surfaces thereof, the opening in the grommet being in communication with the opening in the mass layer.

2. An acoustical barrier according to claim 1 and further comprising a fastener having an elongate stud and a head formed at one end thereof, the elongate stud extending through at least one of the openings.

3. An acoustical barrier according to claim 2 wherein the fastener head is located within the opening in the grommet; and the area between the cross dimensions of the head and the grommet opening is less than the area between the cross dimensions of the stud and the mass layer opening such that wear between the stud and mass layer opening is prevented.

4. An acoustical barrier according to claim 3 wherein the fastener has a central bore extending therethrough.

5. An acoustical barrier according to claim 2 wherein the fastener head is located within the grommet opening and abuts the inner surface of the mass layer; and further comprising a locking sleeve positioned over a free end of the stud opposite the fastener head for securing the fastener to the mass layer.

6. An acoustical barrier according to claim 5 and further comprising a vehicle accessory having a wall sandwiched between the mass layer outer surface and the sleeve to thereby secure the accessory directly to the mass layer.

7. An acoustical barrier according to claim 6 wherein the fastener has a central bore extending therethrough and the accessory includes electrical wires received within the central bore.

8. An acoustical barrier according to claim 1 wherein a central axis of the grommet opening is coextensive with a central axis of the mass layer opening, and further wherein the central axes extend at an acute angle to the plane of the outer surface of the mass layer in the area of the grommet.

9. In a motor vehicle having a barrier wall separating a passenger compartment from an engine compartment and an acoustical barrier mounted to the barrier wall, the barrier wall having an opening extending therethrough, the acoustical barrier including a mass layer of a molded construction and sound dampening characteristics, the mass layer having an inner surface that faces the barrier wall and an outer surface that faces away from the barrier wall; the improvement comprising:
   a grommet integrally molded as a single piece with the mass layer, the grommet having a continuous wall with an upper portion of the wall integrally formed with the inner surface of the mass layer and a lower portion of the wall having a lower edge abutting the barrier wall, an inner surface of the continuous wall defining an opening in the grommet; and
   an opening extending through the mass layer between the inner and outer surfaces thereof, the opening in the grommet being in communication with the opening in the mass layer.

10. The improvement according to claim 9 and further comprising a fastener having an elongate stud and a head formed at one end thereof, the elongate stud extending at least through the mass layer opening.

11. The improvement according to claim 10 wherein the elongate stud further extends through the grommet opening and barrier wall opening with the fastener head abutting one of the barrier wall and the mass layer; and a locking sleeve positioned over a free end of the stud and abutting the other of the barrier wall and mass layer for securing the mass layer to the barrier wall.

12. The improvement according to claim 10 wherein the fastener head is located within the opening in the grommet and abuts the inner surface of the mass layer; and further comprising a locking sleeve positioned over a free end of the stud for securing the fastener to the mass layer.

13. The improvement according to claim 12 and further comprising a vehicle accessory having a wall sandwiched between the mass layer outer surface and the sleeve to thereby secure the accessory directly to the mass layer.

14. The improvement according to claim 13 wherein the fastener has a central bore extending therethrough and the accessory includes electrical wires received within the central bore.

15. The improvement according to claim 9 wherein the opening in the mass layer is laterally and outwardly spaced from the opening in the barrier wall, a central axis of the opening in the grommet being coextensive with a central axis of the opening in the mass layer, the axes extending at an acute angle to the plane of the outer surface of the mass layer in the area of the grommet and intersecting the opening in the barrier wall, whereby the inner surface of the grommet wall serves as a guide for installing accessories through the openings in the barrier wall and mass layer.

16. The improvement according to claim 15 wherein the fastener has a central bore extending therethrough.

17. The improvement according to claim 10 wherein the fastener head is located within the opening in the grommet; and the area between the cross dimensions of the head and the grommet opening is less than the area between the cross dimensions of the stud and the mass layer opening such that wear between the stud and mass layer opening is prevented.

18. In a motor vehicle acoustical barrier assembly having a barrier wall separating a passenger compartment from an engine compartment and an acoustical barrier mounted to the barrier wall, the barrier wall having a plurality of openings extending therethrough, the acoustical barrier including a mass layer of a molded construction and sound dampening characteristics, the mass layer having an inner surface that faces the barrier wall and an outer surface that faces away from the barrier wall, the mass layer further having an opening in communication with each of the plurality of openings in the barrier wall; the improvement comprising:

a plurality of grommets integrally molded as a single piece with the mass layer, each grommet having a continuous wall with an upper portion of the wall integrally formed with the inner surface of the mass layer and a lower portion of the wall having a lower edge abutting the barrier wall, and each of the grommets surrounding one of said plurality of barrier wall openings and one of the mass layer openings.

19. The acoustical barrier according to claim 18 and further comprising:

a first fastener having an elongate stud and a head formed at one end thereof, the elongate stud extending through the opening of a first grommet of the plurality of grommets, a corresponding first mass layer opening of the plurality of mass layer openings, and a corresponding first barrier wall opening of the plurality of barrier wall openings, with the fastener head abutting one of the barrier wall and the mass layer; and a locking sleeve positioned over a free end of the stud and abutting the other of the barrier wall and mass layer for securing the mass layer to the barrier wall.

20. The acoustical barrier according to claim 19 and further comprising a second fastener having an elongate stud and a head formed at one end thereof, the head of the second fastener being located within the opening of a second grommet of the plurality of grommets and abutting the inner surface of the mass layer, the stud extending through a second corresponding mass layer opening; and further comprising:

a second locking sleeve positioned over a free end of the stud of the second fastener for securing the second fastener to the mass layer;

a vehicle accessory having a wall sandwiched between the mass layer outer surface and the second locking sleeve to thereby secure the accessory directly to the mass layer in the vicinity of the second grommet.

21. The acoustical barrier according to claim 20 wherein the second fastener has a central bore extending therethrough and the accessory includes electrical wires received within the central bore.

22. An acoustical barrier according to claim 21 wherein the plurality of grommets includes a third grommet with a third grommet opening, the plurality of mass layer openings including a third mass layer opening, the third mass layer opening being laterally and outwardly spaced from a further barrier wall opening, a central axis of the third grommet opening being coextensive with a central axis of the third mass layer opening, the axes extending at an acute angle to the plane of the outer surface of the mass layer in the area of the third grommet and intersecting the further opening in the barrier wall, whereby the inner surface of the wall of the third grommet serves as a guide for installing accessories through the third mass layer opening and the further barrier wall opening.

23. An acoustical barrier according to claim 20 wherein the area between the cross dimensions of the head of the second fastener and the second grommet opening is less than the area between the cross dimensions of the second fastener stud and the second mass layer opening such that wear between the second fastener stud and the second mass layer opening is prevented.

* * * * *